No. 719,468. PATENTED FEB. 3, 1903.
W. R. HOWARD.
FEED BOX.
APPLICATION FILED SEPT. 3, 1902.
NO MODEL.

Witnesses:
Geo. M. Copenhaver
S. N. Mallory

Inventor
William R. Howard
by H. N. Low
atty.

THE NORRIS PETERS CO., PHOTO-LITHO., WASHINGTON, D. C.

United States Patent Office.

WILLIAM R. HOWARD, OF LOUISVILLE, KENTUCKY, ASSIGNOR OF ONE-HALF TO PRESTON W. JAMES, OF LOUISVILLE, KENTUCKY.

FEED-BOX.

SPECIFICATION forming part of Letters Patent No. 719,468, dated February 3, 1903.

Application filed September 3, 1902. Serial No. 121,971. (No model.)

*To all whom it may concern:*

Be it known that I, WILLIAM R. HOWARD, a citizen of the United States, residing at Louisville, in the county of Jefferson and State of Kentucky, have invented new and useful Improvements in Feed-Boxes, of which the following is a specification.

My improvements relate to feed-boxes especially designed for the feeding of horses or other cattle, and have for their object to closely and accurately regulate the amount of feed which can pass at one time into that portion of the box which is accessible to the horse, so that the animal cannot reach more than one mouthful at a time and cannot gather up more grain or feed than he can consume at once. Waste of feed by the animal picking it up and dropping it outside of the box is thus avoided, and he is also prevented from rooting the feed out of the box with his nose.

The invention consists in the parts and combinations thereof hereinafter set forth and claimed.

In order to make the invention more clearly understood, I have shown in the accompanying drawings means for carrying the same into practical effect without limiting my improvements in their useful applications to the particular construction which for the sake of illustration I have delineated.

Figure 1:
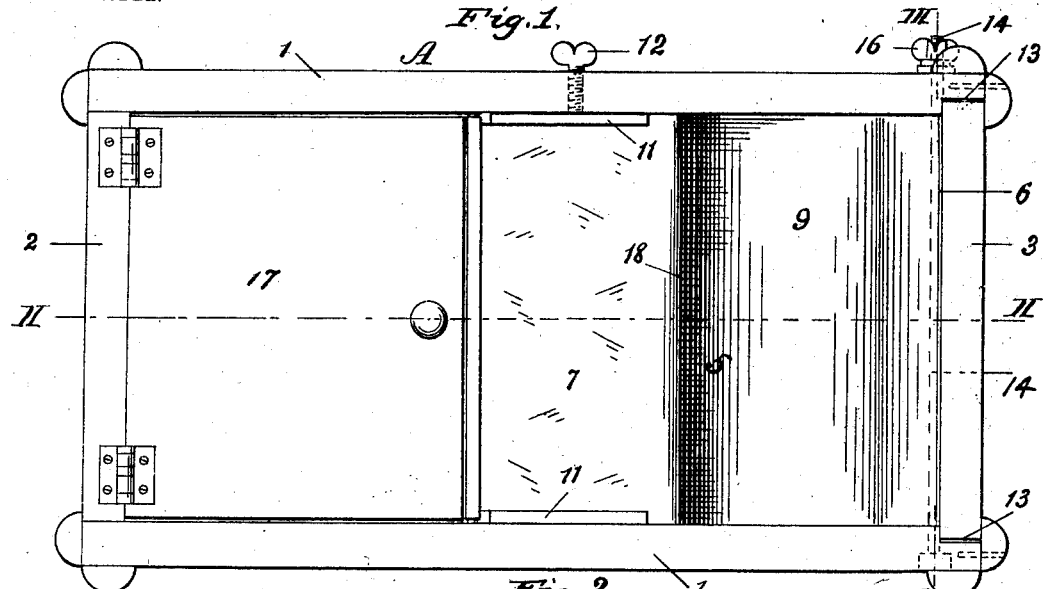
Figure 2:
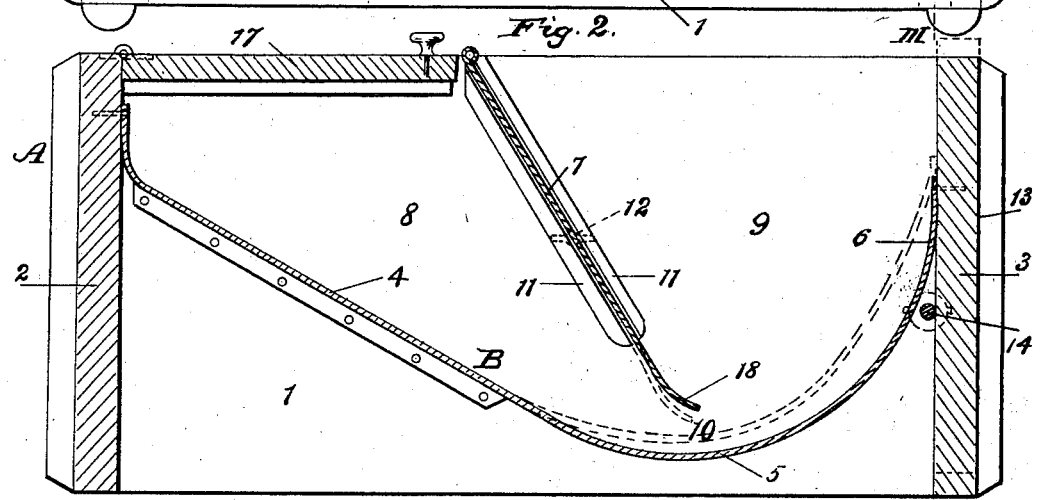
Figure 3:
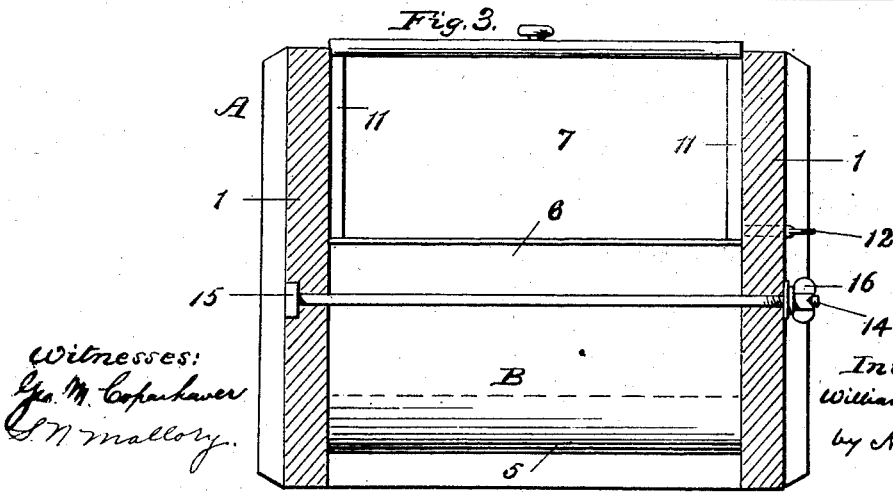

In said drawings, Figure 1 is a plan view of a feed-box embodying the invention. Fig. 2 is a vertical longitudinal section of the same on line II II, Fig. 1. Fig. 3 is a vertical transverse sectional view on line III III, Fig. 1.

Referring to the drawings, A indicates the body of the box, having sides 1 1, a back 2, and front 3. Within the body is secured a bottom B, having a rear forwardly and downwardly inclined portion 4, a bottom (somewhat sharply curved) portion 5 extending continuously from the rear inclined part and extending upward to form a front 6. Combined with the receptacle thus formed is a partition 7, which divides the box into a rear feed holding and supplying compartment 8 and a forward feeding-compartment 9. This partition extends down to a point near and opposite to the lowest part of the curve 5, leaving an opening 10, through which feed may pass gradually from the rear to the front compartment as fast as it is consumed in the latter. Feed-controlling slides have been heretofore proposed arranged between two compartments of a feed-box; but the shape of the bottom has not been such as to prevent the accumulation of an undesirable quantity of grain in the feeding-receptacle, which has resulted in waste. The proper regulation of the passage of the feed through the opening 10 depends largely on the shape of the bottom in front of said opening. The bottom should rise somewhat abruptly from a point immediately below the lower edge of the partition 7, leaving only sufficient room in front of the partition for the horse's nose. It will be observed that the construction above described fulfils these conditions and prevents the accumulation of feed in the compartment 9, as has been the case where a flat bottom extends forward from the partition 7. The partition is by preference inclined forward and downward, thus bringing its lower edge to the position desired and leaving more room for the horse's nose.

The partition may either be fixed originally in the desired position or may be constructed to be adjustable upward and downward at will. As illustrated, it is vertically movable between the walls 1 in guides 11 and may be clamped in place by a set-screw 12, screwing inward and outward in one of the walls 1 and adapted to abut against the edge of the partition.

I further provide for adjusting the front part 6 of the bottom B relative to the partition, whereby the shape of the curved bottom portion 5 is altered and the capacity of the lower part of the compartment 9 may be increased or diminished. This gives the most accurate means of feed regulation. To this end the part 6 is not fixedly attached to the sides 1, but is joined to the upper part of the front 3, and the latter is vertically adjustable relative to said sides. Various means of adjustment may be employed for this purpose. I have illustrated the sides 1 as provided with vertical guides 13 for the end 3 and as adapted to be drawn together to grasp said end when the latter is adjusted by a rod 14, which passes through said sides and engages the latter by a head 15 and thumb-nut 16.

The bottom parts 5 and 6 are made of yielding or flexible sheet metal or other material to allow of such adjustment and of the changing of the curve at 5.

The rod 14 has the further function of drawing the sides 1 closely and firmly against the side edges of the bottom D after the adjustment of the front 3, so as to keep the bottom tight. Said sides have no fixed connection with each other except through the end 2. The connection through the part 4 is more or less yielding.

The lower part of the partition 7 may be forwardly curved, as shown at 18, to give a cup-like shape to the bottom of the compartment 9. This part 18 is somewhat flexible and can be moved by the animal in feeding, as indicated in dotted lines in Fig. 2, to and in working down the feed from the compartment 8.

The compartment 8 is provided with a hinged cover 17.

The feed-box made according to my invention may be built in place in stables or barns or made portable for use on streets and roads.

Having thus described my invention, what I claim, and desire to secure by Letters Patent, is—

1. A feed-box having side walls 1 and divided into two compartments, with the communicating opening 10, the bottom of the forward or feeding compartment being curved upward directly from said opening, and adjustable, and means for adjusting the bottom between and relative to said side walls, substantially as set forth.

2. A feed-box divided into two compartments, with the communicating opening 10, the bottom of the forward or feeding compartment being curved upward from said opening, and a partition having the forwardly-curved elastic lip 18, substantially as set forth.

3. A feed-box divided into two compartments, with a communicating opening at the bottom, the feeding-compartment having a bottom adjustable upward and downward relative to the upper edge of such opening, and means for holding said bottom, when adjusted, in fixed position, substantially as set forth.

4. A feed-box having a flexible curved bottom and means for bending and adjusting said bottom upward and downward, substantially as set forth.

5. A feed-box having the side and end pieces forming a portable supporting-frame, a curved metallic bottom above the bottom of said frame, a partition dividing the box into two compartments with a communicating opening, and means for regulating said opening, substantially as set forth.

6. In a feed-box the combination of a movable bottom, inwardly-movable sides, and means for clamping said sides against the bottom, substantially as set forth.

7. In a feed-box the combination with the bottom, of a partition-plate having its main portion held from movement and having its lower part movable toward and from the supplying-compartment, substantially as set forth.

8. A feed-box having its bottom vertically adjustable, combined with a dividing-partition also adjustable upward and downward independently of said bottom, as set forth.

In testimony whereof I affix my signature in presence of two witnesses.

WILLIAM R. HOWARD.

Witnesses:
 FRANK W. MUANCY,
 CLAUDE W. JOHNSON.